April 30, 1929.  F. HODGKINSON  1,710,733
CONDENSER
Filed Oct. 30, 1926  2 Sheets-Sheet 2

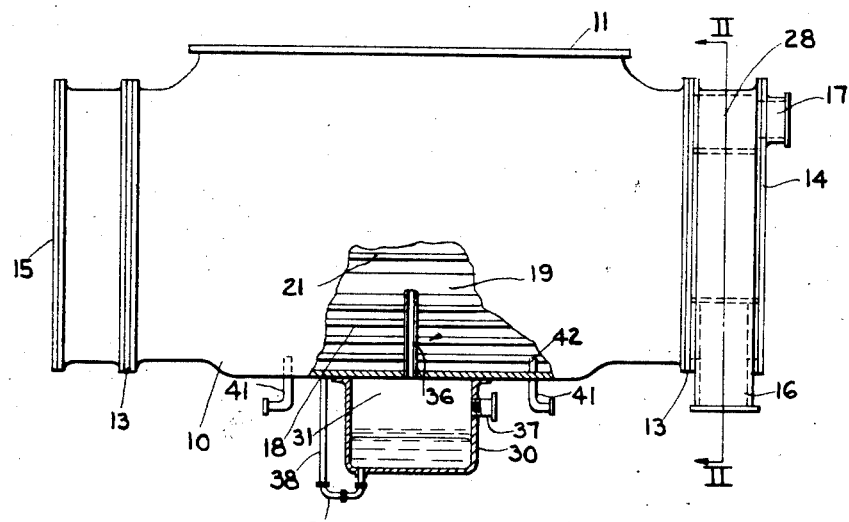
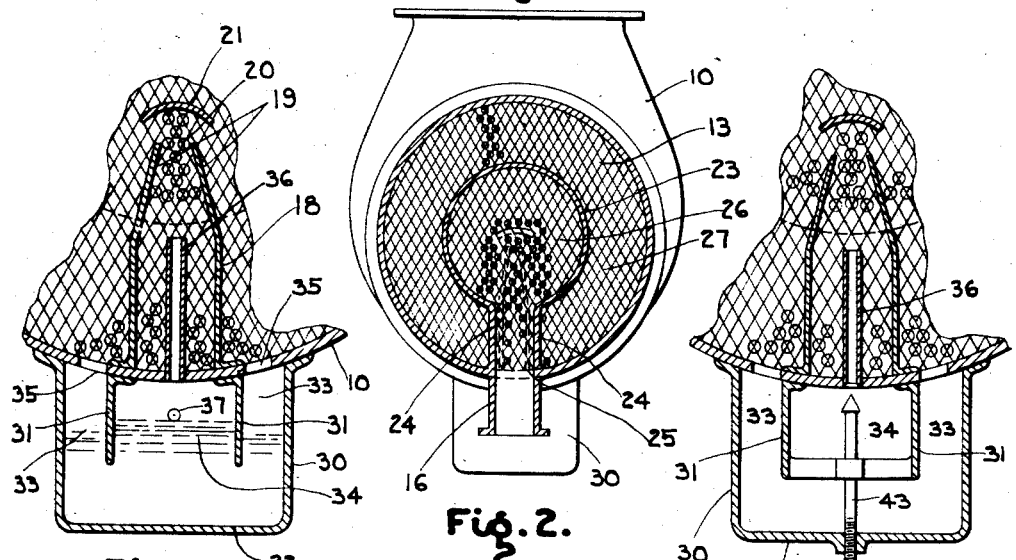
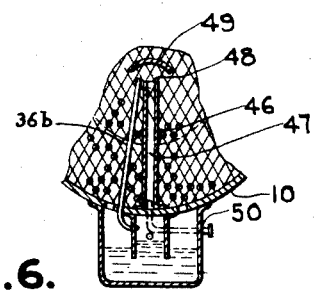

WITNESSES:
E. Lutz

F. Hodgkinson
INVENTOR
BY
A. B. Reavis
ATTORNEY

Patented Apr. 30, 1929.

1,710,733

UNITED STATES PATENT OFFICE.

FRANCIS HODGKINSON, OF SWARTHMORE, PENNSYLVANIA, ASSIGNOR TO WESTING-HOUSE ELECTRIC & MANUFACTURING COMPANY, A CORPORATION OF PENNSYLVANIA.

CONDENSER.

Application filed October 30, 1926. Serial No. 145,263.

My invention relates to condensers, more particularly of the steam power plant type, and it has for its object to provide apparatus of this character having a condensate collection or hotwell arrangement which shall be effective to promote the separation of non-condensable media from the condensate.

In the operation of power plant condensers, non-condensable gases are absorbed by the condensate; and, as such gases, particularly air and oxygen, may result in corrosion of parts contacted thereby, it is desirable that such gases shall be removed so far as is possible. To this end, I provide a condensate collection apparatus or hotwell which is divided into two zones or columns communicating at the bottom, one of the zones or columns constituting an inlet portion for condensate and the other zone or column constituting an outlet portion therefor. Such an arrangement provides an effective water seal between the upper parts of the inlet and discharge portions. The outlet portion is connected to a region of the condenser apparatus whose pressure is below that corresponding to the temperature of the condensate, with the result that evaporation and ebullition take place in the outlet portion and dissolved non-condensable gases tend to be liberated. This action of liberation of dissolved gases is due to the lower pressure existing in the outlet or discharge portion. While it is old to deaerate feed water, my invention differs from apparatus of this character in that I utilize the condenser and the hotwell, the latter being specially constructed, in order that all physical phenomena necessary to secure deaeration may be supplied by the condensing apparatus itself. In other words, I provide condensing apparatus proper which is equipped with certain novel features of construction permitting of the automatic and continuous removal of non-condensable media from the condensate.

A further object of my invention is to provide a condenser of the radial-flow type having a hotwell construction divided into an inlet portion for receiving condensate and into an outlet portion having a conduit, which enters the tube nest and terminates well within the latter, this conduit serving to create a pressure in the outlet portion which is lower than that corresponding to the condensate temperature with the result that evaporation and ebullition take place in the outlet portion and the resulting vapors and gases pass through the conduit to the interior of the tube nest where the condensable portions of such vapors or gases are condensed and the non-condensable portions thereof go on to the air offtake of the condenser proper and are withdrawn in the ordinary way.

These and other objects are effected by my invention, as will be apparent from the following description and claims taken in connection with the accompanying drawings forming a part of this application, in which:

Fig. 1 is a view partly in side elevation and partly in section showing a condenser of the radial flow type having my invention applied thereto;

Fig. 2 is a sectional view taken along the line II—II of Fig. 1 and viewed in the direction of the arrows;

Fig. 3 is a fragmentary transverse sectional view of apparatus shown in Fig. 1;

Fig. 4 is a fragmentary sectional view showing a modified feature of construction employed with apparatus of the character illustrated in Figs. 1 to 3 inclusive;

Fig. 6 is a fragmentary sectional view showing a further modified form of air removal apparatus;

Figures 8, 9:
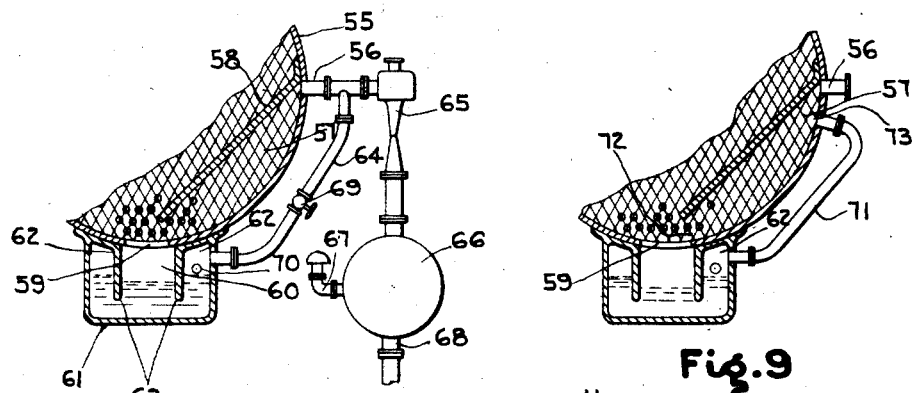
Figs. 8 and 9 are fragmentary sectional views showing the application of my invention to a condenser of the down flow type.

Referring now to the drawings more in detail for a better understanding of my invention, in Figs. 1, 2 and 3, I show a condenser of the radial flow type having a shell 10 provided with an inlet 11 for exhaust steam. Tube plates 13 are secured to the ends of the shell preferably by water box constructions 14 and 15, the water box construction 14 being provided with an inlet 16 and an outlet 17 for condensing water.

The interior of the shell 10 has connected thereto partitions 18 secured to the bottom of the shell and extending upwardly and radially in substantially parallel relation for a suitable distance and then approaching or converging, as indicated at 19, to provide an outlet opening or port 20 for the egress of air and non-condensable gases from the condenser. A deflector or rain-plate construction 21 is arranged above the opening or port 20 to prevent the entry of condensate thereinto. This arrangement of offtake structure in general is well-known and a further description thereof is unnecessary, and it has been specifically referred to only to the extent of laying a foundation for coacting structure presently to be described.

The water box structure 14 is of special form, as may be seen from Figs. 1 and 2, in that it incorporates an inner circular partition 23 having downward extending parallel portions 24 which define a passage 25 communicating with the inlet 16. The wall or partition portions 24 are arranged in substantial alignment with the lower portions of the partitions 18 already referred to.

The partition construction, including the parts 23 and 24, divides the eccentrically disposed tube nest of the condenser into a first-pass portion 26 and a second-pass portion 27, the tubes arranged in the passageway 25 being in the first-pass.

The water box construction 15 at the other end of the condenser provides for the return flow of cooling water in the ordinary way, such water passing through the second-pass 27, entering the outlet water box space 28, and being discharged from the outlet 17.

A hotwell or condensate collection chamber 30 is connected to the bottom of the condenser shell in the ordinary way and partitions 31 are arranged within the chamber 30, these partitions being preferably connected to the bottom of the shell and being spaced from the bottom wall 32 of the chamber 30. The partitions 31 divide the chamber into bottom communicating columns or zones 33 and 34, the columns or zones 33 communicating with the interior of the shell 10 by way of suitable openings 35 disposed slightly beyond the vertical partitions 18, so that condensate may pass from the shell to such inlet portions, zones, or columns of the hotwell construction, and the outlet zone, column or portion 34 being connected by a conduit 36, therefore provides for the connection of the outlet column, zone or portion 34 to a region of the condenser where pressure prevails normally lower than that corresponding to the temperature of the condensate, with the result that evaporation takes place in the outlet portion and the separation of dissolved non-condensable gases is facilitated, vapors and non-condensable gases passing through the conduit 36 to the interior of the condenser.

Under the conditions set forth, the pressure in the inlet portion of the zone 33 will be somewhat higher than that in the outlet portion 34, and, therefore, the level of condensate in the outlet portion 34 will be higher than that in the inlet portion or zone 33. A condensate outlet 37 communicates with the outlet zone of portions 34 at a suitable elevation and it is connected to any suitable condensate removal apparatus (not shown).

With the arrangement shown in Figs. 1, 2 and 3, the conduit 36 enters the space between the partitions 18, tubes of the first-pass 26 being disposed laterally thereof as well as above its upper end, such tubes serving to condense condensable vapors discharged from the conduit 36 as well as to cool the non-condensable gases discharged thereby.

Condensate forming between the partitions 18 passes through a drain 38, preferably having a U-shaped or sealing portion 39 connected to the bottom of the hotwell 30.

One or more air outlets 41 have their inlet ends 42 arranged slightly above the bottom of the shell so as to avoid the entry of condensate thereinto. Any suitable air removal apparatus commonly used in the art for this purpose may be connected to the air outlets 41.

From the foregoing description, the operation of apparatus made in accordance with Figs. 1, 2 and 3 will be apparent, the purpose being to secure evaporation or ebullition of condensate in the hotwell construction by the novel arrangements referred to, this result being secured by having the hotwell formed as a water seal construction, the inlet portion 33 of which receives condensate from the shell and the outlet portion 34 of which is connected to a region of the condenser having a pressure normally lower than that corresponding to the condensate temperature, thus resulting in evaporation and ebullition of condensate in the outlet portion. The rate or extent of evaporation, and therefore the removal of dissolved non-condensable gases, may be controlled by changing the area of the outlet portion 34. Variation in the pressure drop from the outlet portion 34 to the exit end of the conduit 36 also serves to control ebullition in the portion 34. Hence, this effect may be secured by choosing a conduit 36 of suitable bore. Variation in the height of the conduit 36 also has its effect, that is, shortening of such conduit brings the exit end thereof to regions of successively lower pressures, thereby tending to increase ebullition.

In addition to the ways just referred to for controlling ebullition in the outlet portion or zone 34 of the hotwell, I may employ adjustable valve means for this purpose, such a construction being shown in Fig. 4, wherein an adjustable valve 43 extends through the bottom 32 of the hotwell and cooperates with the lower end of the conduit 36 in order that the pressure in the outlet portion 34 may be controlled.

Figure 5:
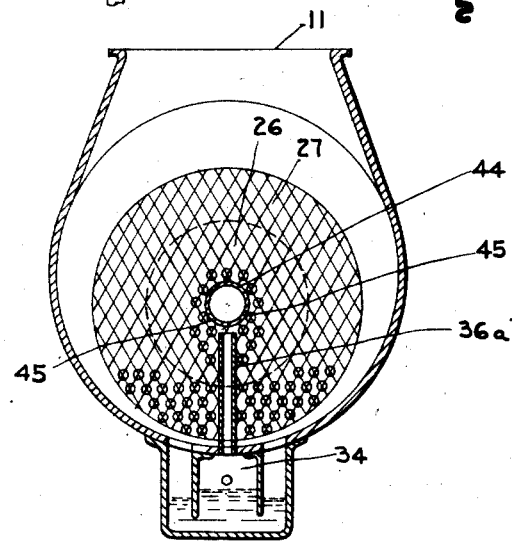
Fig. 5 is a fragmentary sectional view, similar to Fig. 3, but showing a different type of air removal apparatus.

In Fig. 5, I show my invention applied to a radial flow condenser having a different type of offtake structure. Here, partitions are not employed, but, on the contrary, an air and non-condensable gas offtake pipe or tube 44 having inlets 45 is disposed centrally of the first-pass 26 of the tube nest. The conduit 36ᵃ, for lowering the pressure in the outlet portion or zone 34 of the hotwell construction and so producing ebullition, enters directly into the tube nest, this conduit preferably passing through the tubes of the second-pass 27 and into the tubes of the first-pass 26, and having its upper end terminating in the vicinity of the air offtake. I may arrange to vary the height of the conduit 36ᵃ, and so vary the pressure in the outlet portion 34, for the nearer the upper end of the conduit 36ᵃ approaches the air offtake 34 the lower is the pressure of the region it reaches and consequently the lower will be the pressure resulting in the outlet portion 34. The converse is true. The desired pressure in the outlet portion 34 may be changed in other ways already described.

In Fig. 6, I show a further modified form of my invention applied to a condenser of the radial flow type. In this view, the bottom of the condenser shell 10 has connected thereto vertical plates 46 defining an air offtake space having an entrance 48 above which is disposed a deflector 49. The space 47 is a free passage for the discharge of non-condensable gases and vapors, this space being connected to suitable outlets 50 connected to any suitable air removal apparatus. The hotwell is similar in structure to that shown in Figs. 1, 2, 3 and 5. Here, however, the conduit 36ᵇ is arranged externally of the partitions 46, passing up between the tubes of the nest, but acting for the purposes already specifically set forth.

Figure 7:
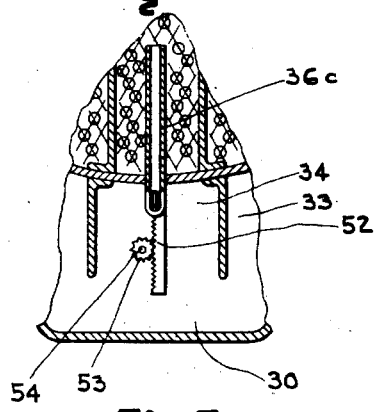
Fig. 7 is a fragmentary sectional view showing an adjustable air offtake.

In Fig. 7, I show further means for controlling the pressure in the outlet portion 34 by securing adjustment of the conduit 36ᶜ. To this end, the conduit 36ᶜ has a slidable fit through a suitable opening provided in the bottom of the shell and such conduit has connected to its lower end a rack 52, which meshes with the pinion 53 connected to a shaft 54 which extends exteriorly of the hotwell 30 and has any suitable operating means connected thereto.

In Figs. 8 and 9, I show the application of my invention to condensers of the down flow type. In Fig. 8, the shell 55 has an air and non-condensable offtake 56 arranged in the ordinary way, the offtake 56 communicating with a space 57 between the shell 55 and a plate 58 of conventional construction and containing any suitable number of cooling tubes. At its bottom, the shell 55 is provided with an opening 59 leading to the center or inlet portion 60 of the hotwell construction 61, the inlet portion 60 being separated from the outlet portion or zone 62 by the partition means 63, the latter terminating at a suitable distance above the bottom of the hotwell. The necessary lower pressure in the outlet portion 62 to secure evaporation and ebullition of condensate is secured by having a conduit connection 64 connected to any suitable air removal apparatus; and, while I have shown the conduit 64 connected to the conduit 56 leading to an air ejector 65, the latter discharging into an after-condenser or cooler 66 having a vent 67 and a condensate outlet 68, it will be obvious to those skilled in the art that the conduit 64 may be connected to any other air removal apparatus. Condensate resulting from condensation of the motive fluid employed in the ejector 65 as well as condensate of any other condensable medium is lead by condensate outlet 68 to any suitable power plant apparatus in a manner well known in the art. The conduit 64 may contain a suitable valve 69 in order that a desired pressure may be obtained in the outlet portion or zone 62 and the evaporator controlled. An outlet 70 communicates with the outlet zone 62 and it is connected to any suitable condensate removal apparatus of a well known type.

In principle, the operation of the apparatus shown in Fig. 8 is generally similar to that already described, low pressure being secured in the discharge or outlet zone of the hotwell construction by the connection of such zone to the air removal apparatus instead of to a portion of the condenser of lower pressure. The tubes arranged in the space 57 offer resistance to the passage of air and non-condensable vapors and, therefore, result in a pressure drop from the inlet of space 57 to the outlet 56. Hence, the conduit 64 is connected to the conduit 56 or a region where a pressure prevails which is less than that corresponding to the condensate temperature.

In Fig. 9, I show a further application of my invention to a condenser of the down flow type wherein the outlet portion or zone 62 has its pressure lowered in a different way. In this view, I show a conduit 71 connected to the outlet portion or zone 62 at one end and having its other end connected to the portion of the air and non-condensable vapor or cooling space 57 adjacent to the offtake 56. The tubes in this space offer resistance between the entrance 72 and the region of the discharge end 73 of the conduit 71, with the result that the pressure at the region of the discharge end 73 will be perceptibly less than at the entrance 72; and, therefore, the outlet portion 62 will be subjected to a pressure less than that corresponding to the temperature of the condensate and boiling and ebullition will take place in the manner already referred to, the resulting vapors and gases passing through the conduit 71 and being discharged into the space 57. In view of the fact that the exit end 73 of the conduit 71 discharges into the space 57 and that cooling tubes are arranged in the vicinity of and above the discharge end, condensation of condensable vapors passing through the conduit 71 will take place, the condensate passing back to the hotwell through the opening 59.

From the foregoing, it will be apparent that I have devised a condenser of conventional type and appearance which incorporates certain additional features of construction and improvements in order that physical phenomena normally obtaining in a condenser may be availed of for the purpose of securing removal of non-condensable gases dissolved in the condensate, this effect being secured by dividing the condensate into two portions connected by a hydraulic seal, one portion being subjected to a pressure corresponding approximately to the temperature of the steam at the condensate outlet and the other portion being subjected to a pressure lower than that corresponding to the condensate temperature with the result that the condensate in such other portion will boil and dissolved gases will separate. It is characteristic of my invention that my process of removing dissolved gases from condensate is carried out within the condenser structure; and, by "condenser structure", I mean a condenser and its associated hotwell.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a condenser having a shell and air and non-condensable gas withdrawal means, the combination of a hotwell formed to provide a water seal having inlet and discharge portions, means providing for the admission of condensate from the shell to said inlet portion, means for connecting the discharge portion to a region of the condenser wherein a pressure prevails lower than that corresponding to the condensate temperature, cooling means being interposed between the discharge end of the last named means and air withdrawal means, and means for withdrawing condensate from said discharge portion.

2. In a condenser having a shell and air and non-condensable gas withdrawal means, a nest of tubes within the shell, a hotwell, partition means within the hotwell for dividing the latter into lateral and intermediate bottom communicating sections, said shell having openings in the bottom portion thereof for admitting condensate to the lateral sections, means for venting gaseous media from the intermediate section to a region within the tube nest adjacent to the air and non-condensable gas withdrawal means where a pressure prevails less than that corresponding to the condensate temperature, and means for withdrawing condensate from the intermediate section.

3. In a condenser of the radial flow type having a nest of tubes, the combination of a hotwell formed to provide a water seal having inlet and discharge portions, means providing for the admission of condensate to said inlet portion, and means for venting gaseous media from said discharge portion to a region within the tube nest of the condenser.

4. In a condenser of the radial flow type, having a shell and a nest of tubes, the combination of a hotwell formed to provide a water seal having inlet and discharge portions, said shell having an opening to provide for the passage of condensate therefrom to said inlet portion, and a conduit connected to said outlet portion and terminating within the tube nest for venting gaseous media from the discharge portion to the tube nest.

5. In a condenser of the radial flow type having a shell, a tube nest, and an air and non-condensable gas offtake disposed within the tube nest, the combination of a hotwell formed to provide a water seal having inlet and discharge portions, said shell having means providing for the passage of condensate therefrom to said inlet portion, and a conduit connected to the top of said discharge portion and terminating within the tube nest adjacent to said air and non-condensable gas withdrawal means for venting gaseous media from the discharge portion to the tube nest.

6. In a condenser having a shell, a nest of tubes, and air withdrawal means, the combination of a hotwell formed to provide a water seal having inlet and discharge portions, said shell having means for admitting condensate to said inlet portion, means for connecting the top of said discharge portion to a region within the tube nest for venting gaseous media from said discharge portion to the tube nest, said last-mentioned means having cooling tubes interposed between the discharge terminus thereof and the air offtake, and means for withdrawing condensate from the discharge portion.

7. In a condenser of the radial flow type having a shell and a nest of tubes, the combination of a pair of partitions extending upwardly from the bottom of the shell and terminating within the tube nest to form an air and non-condensable gas offtake space, air and non-condensable gas outlet means communicating with said space, a hotwell formed to provide a water seal having inlet and discharge portions, said shell having means for admitting condensate to said inlet portion, a conduit connected to said discharge portion, extending upwardly between said partitions and terminating intermediate the height of the latter, said tube nest including tubes arranged between said partitions, means providing for the passage of cooling medium first through the tubes between the partitions and the tubes constituting the central core of the nest and then through the outermost tubes, drainage means connecting the bottom of the space between the partitions to the hotwell, and means for withdrawing condensate from said discharge portion.

8. In a condenser of the radial flow type having a shell, the combination of a central group of first-pass tubes, second-pass tubes surrounding the first-pass tubes, partition members connected to the bottom of the shell, extending radially through the second-pass tube zone and terminating within the first-pass tube zone, a hotwell formed to provide a water seal having inlet and discharge portions, said shell having means for admitting condensate therefrom to said inlet portion, a conduit connected to said discharge portion and terminating intermediate the height of the partitions, and discharge means for condensate connected to said discharge portion.

9. In a condenser having a shell, the combination of a pair of partition members connected to the bottom of the shell and affording an air and non-condensable gas offtake space, first-pass tubes forming a nest core arranged exteriorly of the partitions and arranged between the partitions, second-pass tubes surrounding said first-pass core tubes, a hotwell formed to provide a water seal having inlet and discharge portions, said shell having means for discharging condensate into said inlet portion, means for connecting said discharge portion to the space between said partitions intermediate the height thereof, drainage means connected to the bottom of said space between said partitions and to said hotwell, air withdrawal means having its inlet arranged above the inlet of the drainage means, and means providing for the discharge of condensate from said discharge portion.

10. In a condenser having a shell and a nest of tubes therein surrounding the air and non-condensable gas offtake, the combination of a hotwell formed to provide a water seal having inlet and discharge portions, said shell having means for discharging condensate therefrom to said inlet portion, means for affording communication between the discharge portion and a region within the tube nest, and means whereby the pressure resulting due to the action of the last-named means may be varied.

11. A surface condenser comprising a shell having an inlet and an air removal connection, heat transfer tubes disposed within the shell for condensing gaseous media, means defining a passage from said heat transfer tubes to said air removal connection, other heat transfer tubes disposed in said passage for cooling air and other non-condensable gases, a hotwell formed to provide a water seal having inlet and discharge portions, means providing for the admission of condensate from the shell to said inlet portion, and means for venting gaseous media from said discharge portion to said passage at a point adjacent said air removal connection.

12. A surface condenser comprising a shell having an inlet and an air removal connection, a nest of heat transfer tubes disposed within the shell, means providing a passage from substantially the central portion of said nest to said air removal connection for conducting air and other non-condensable gases to said connection, a hotwell formed to provide a liquid seal having inlet and discharge portions, means providing for the admission of condensate from the shell to said inlet portion, and means for venting gaseous media from said discharge portion to a point within the nest of tubes and adjacent the inlet of said passage.

13. A surface condenser comprising a shell having an inlet, a nest of heat transfer tubes disposed within the shell, means for directing cooling media through the tubes in a plurality of passes, a hotwell formed to provide a water seal having inlet and discharge portions, means providing for the admission of condensate from the shell to said inlet portion, and means for venting gaseous media from said discharge portion to a region within the tubes of the first of said plurality of passes.

14. A surface condenser comprising a shell having an inlet and an air removal connection, a nest of heat transfer tubes disposed within the shell, means for supplying different groups of the tubes with circulating media of different temperatures, means providing a passage within the shell and about some of the tubes supplied with circulating media of the lower of said different temperatures to the air removal connections, a hotwell formed to provide a liquid seal having inlet and discharge portions, and means for venting gaseous media from the discharge portion to said passage at a point adjacent the inlet thereof.

In testimony whereof, I have hereunto subscribed my name this eighth day of October, 1926.

FRANCIS HODGKINSON.